United States Patent [19]

Szymaszek et al.

[11] Patent Number: 4,923,173
[45] Date of Patent: May 8, 1990

[54] SEATING SEAL MEANS FOR DISC-TYPE VALVE

[75] Inventors: Paul G. Szymaszek, Waukesha; Earl Schumacher, New Berlin, both of Wis.

[73] Assignee: Vilter Manufacturing Corporation, Milwaukee, Wis.

[21] Appl. No.: 429,015

[22] Filed: Oct. 30, 1989

[51] Int. Cl.$^5$ .............................................. F16K 1/46
[52] U.S. Cl. .................................... 251/333; 251/356
[58] Field of Search ................ 251/356, 333; 137/312

[56] References Cited

U.S. PATENT DOCUMENTS

| | | | |
|---|---|---|---|
| 2,886,283 | 5/1959 | Natho | 251/333 X |
| 3,589,676 | 6/1971 | Erickson et al. | 251/333 X |

Primary Examiner—Arnold Rosenthal
Attorney, Agent, or Firm—Nilles & Nilles

[57] ABSTRACT

In a disc-type stop valve, a valve disc located at the lower end of a rotatable valve stem takes the form of a solid cylindrical metal member having an annular groove formed around the periphery of its lower surface in which an annular resiliently deformable plastic seal ring is disposed. The seal ring is held in place by a smaller-diameter circular metal retainer plate which is secured by bolts against the lower surface of the valve disc and against the underside of seal ring. When the valve is closed, a circumferential lower edge of the seal ring bears against a conically-shaped annular metal valve seat surface in the valve body. A large-diameter resilient compressible conventional O-ring is disposed in an annular space defined by the rear side of the retainer plate, the annular inner edge of the seal ring and a chamfered edge along the intersection of the lower surface and the side edge of the valve disc. The O-ring operates, when compressed, to effect a seal in a space between the seal ring and the retainer plate valve disc without requiring maximum compression of the seal ring. Furthermore, when the valve is in operation and partially cracked open, fluid at high pressure is prevented by the O-ring from getting behind the seal ring and forcing it laterally outwardly further increasing the possibility of leakage fluid leakage. A vent hole for pressure relief extends through the valve disc and communicates with the space between the valve disc and the seal ring to insure inner and outer edges of the seal ring are at equal pressures.

15 Claims, 2 Drawing Sheets

SEATING SEAL MEANS FOR DISC-TYPE VALVE

BACKGROUND OF THE INVENTION

1. Field of Use

This invention relates generally to an improved seating seal means for a disc-type stop valve.

2. Description of the Prior Art

Disc-type stop valves are used in various systems to control the flow of liquids and gases and are particularly well suited to control the flow of refrigerants, whether in the gaseous or liquid states, which are circulated under extremely high pressure in refrigeration systems. Such valves typically range in size, for example, from 1" to 8" when measured with reference to the diameter of the valve's inlet/outlet ports.

A typical disc-type stop valve generally comprises a valve housing having an inlet port, an outlet port and an annular valve seat within the housing between the two ports. An externally threaded rotatable valve stem extends through an internally threaded, sealed, valve-stem opening in the housing and is provided at its lower end with a circular valve disc which is axially movable into and out of engagement with the annular valve seat as the valve stem is manually (or otherwise) rotated between closed and open positions, respectively.

The prior art teaches various forms of seating seal means which aim to improve the seal between the valve disc and the annular valve seat to prevent undesirable leakage through the valve when the valve is closed. In one known prior art type of disc-type stop valve used in high pressure refrigeration systems, the valve disc which is located at the lower end of the rotatable valve stem takes the form of a solid cylindrical metal member. The valve disc is connected to the valve stem in such a manner that there is some "play" or relative movement possible between them so that the valve disc can adjustably position itself on the valve seat. The valve disc has an annular groove formed around the outer periphery of its lower surface and an annular seal ring made of plastic, such as TEFLON for example, is disposed in the groove for engaging the valve seat. The plastic seal ring is held in place on the valve disc by a smaller-diameter circular metal retainer plate which is attached to the lower surface of the valve disc and bears against the underside of the seal ring. The retainer plate is secured to the valve disc by a plurality of bolts which extend through holes in the retainer plate and screw into threaded bolt holes in the valve disc. When the valve is closed, the lower corner edge of the plastic seal ring bears against the annular conically-shaped metal valve seat surface in the valve body.

Since the plastic seal ring is slightly resiliently compressible and is also highly wear-resistant, it is able to deform slightly so as to evenly and tightly engage the valve seat surface to provide an even and tight seal when the valve is tightly closed. Upon opening the valve, the resilient plastic seal ring is able to resume its normal shape. The plastic seal ring also has a very low coefficient of friction and resists wear and damage resulting from repeated closures wherein it is tightly pressed against the metal valve seat.

Because of the high fluid pressure conditions which exist at the underside of the valve disc when the valve is closed, there is a possibility of gas or liquid leakage along the following path: through a first space between the rear side of the retainer plate and the front side of the seal ring, through a second space between the inner edge of the sealing ring and the side edge of the annular groove in the valve disc, and through a third space between the rear side of the seal ring and the bottom of the annular groove in the valve disc. Furthermore, when the valve is cracked open slightly, the restricted, high velocity flow of fluid from the high pressure to the low pressure side of the valve through the small opening or space between the valve seat and the seal ring creates a condition whereby fluid can leak through the aforedescribed path. Furthermore, the result of such leakage is that high pressure fluid in the aforesaid second space causes the resilient plastic seal ring to expand or be urged laterally or circumferentially outward relative to the groove due to fluid pressure in the aforementioned second space. Over time, such a phenomenon has the effect of permanently deforming and loosening the plastic seal ring and increasing the possibility of undesirable fluid leakage through the aforesaid flow path when the valve is fully closed.

Heretofore, efforts to prevent fluid leakage and the phenomena described hereinbefore entailed tightening the bolts as much as possible so that the plastic seal ring is tightly compressed in the groove in the valve disc by the metal retainer plate which traps the seal ring in the groove. However, because the TEFLON seal ring required the application of a great deal of force to compress it for even a small amount, and because the bolts involved were necessarily relatively small and few in number, application to the bolts of the high torque required to sufficiently compress the seal ring, often resulted in shearing of the bolts or thread damage thereby substantially increasing the time, labor and cost of manufacturing such a valve.

SUMMARY OF THE PRESENT INVENTION

The present invention provides improved seating seal means for a disc-type stop valve of the aforesaid character. In a disc-type stop valve in accordance with the invention, a valve disc located at the lower end of a rotatable valve stem takes the form of a solid cylindrical metal member having an annular groove formed around the periphery of its lower surface in which an annular plastic seal ring, made of TEFLON or the like, is disposed. The seal ring is held in place by a smaller-diameter circular metal retainer plate which is secured by bolts against the lower surface of the valve disc and against the underside of seal ring. When the valve is closed, the lower corner edge of the seal ring bears against a conically-shaped annular metal valve seat surface in the valve body. A large-diameter, resilient, compressible, conventional O-ring is disposed in an annular space defined by the rear side of the retainer plate, the inner edge of the annular seal ring and a chamfered edge along the intersection of the lower surface and the side edge of the valve disc. The O-ring operates to effect a seal in the hereinbefore described fluid flow path without requiring maximum compression of the plastic seal ring. A vent hole providing for fluid pressure relief extends through the valve disc and communicates with a space in the said flow path between the groove in the valve disc and the seal ring to insure pressure equalization of the inside and outside edge of the seal ring. Furthermore, when the valve is in operation and partially cracked open, fluid at high velocity is prevented by the O-ring from getting behind the seal ring and forcing it laterally or circumferentially outward to further increase the possibility of leakage.

The seating seal means in accordance with the present invention provides several advantages over the prior art. For example, installation of the O-ring at the specified location prevents gas leakage through various routes such as: between the retainer plate and the seal ring; through the bolt holes in the retainer plate and between the retainer plate and the valve disc and between the walls of the groove and the valve disc and the seal ring. In other words, compression of the O-ring by reasonable torquing of the bolts closes off all of the aforesaid routes without imposing undue, possibly damaging torque on the bolts which might shear or otherwise damage the bolts during assembly of the valve. Furthermore, the O-ring is installed in an annular space bounded by a chamfered peripheral edge on the valve disc, the retainer plate and the seal ring. Thus, there is no need to undertake costly precision machining of the valve disc and/or the seal ring to provide a groove for receiving the O-ring. Only a simply and economically formed chamfered edge needs to be provided on the valve disc to cooperate with the other components to define the O-ring space. The thickness of the seal ring is initially slightly greater than the depth of the groove in the valve disc in which it is mounted and this allows for some compression of the seal ring during installation to further inhibit fluid leakage and aids in effecting compression of the O-ring. When the valve is cracked open, the O-ring prevents high-velocity high pressure fluid from getting behind the inner edge of the seal ring and causing the seal ring from being forced laterally outwardly creating a leakage route, and damaging deformation of the seal ring itself. Other objects and advantages of the invention will hereinafter appear.

DRAWINGS

DESCRIPTION OF A PREFERRED EMBODIMENT

Figure 1:
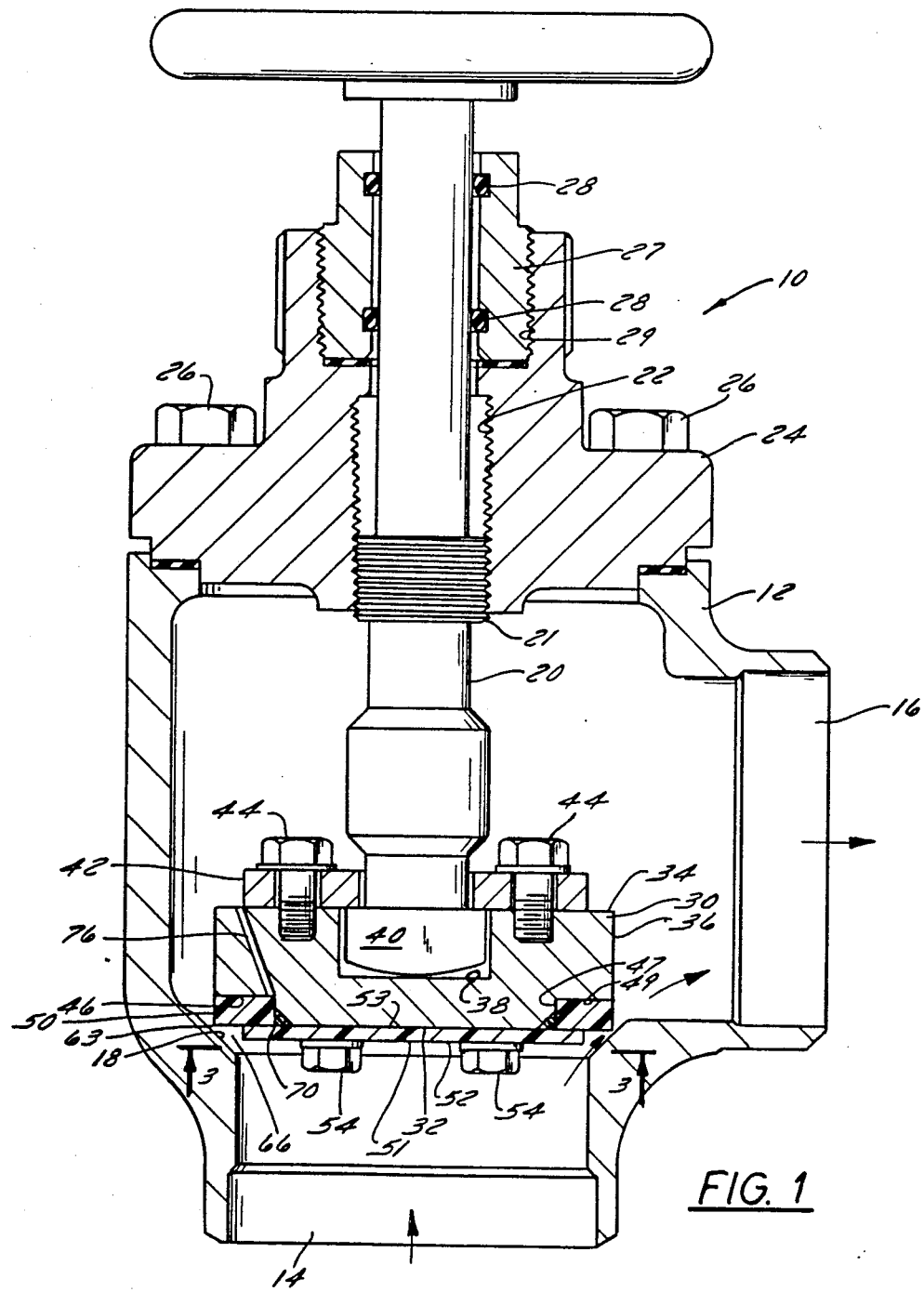
FIG. 1 is a vertical cross-section view of a disc-type stop valve incorporating improved seating seal means in accordance with the invention.

Referring to FIG. 1, there is shown a disc-type stop valve 10 having improved seating seal means in accordance with the invention. Valve 10 generally comprises a valve housing 12 having an inlet port 14, an outlet port 16 and an annular conically-shaped metal valve seat 18 within the housing between the two ports. A rotatable valve stem 20, externally threaded as at 21, extends through an internally threaded valve-stem opening 22 in a cover plate 24 which is secured to housing 12 by bolts 26 and sealing rings 28 are provided in a bushing 27 in a threaded hole 29 in cover plate 24 at the upper end of the valve stem. Valve stem 20 is provided at its lower end with a circular valve disc 30 which is axially movable toward and away from annular valve seat 18 between closed and open position, respectively, as valve stem 20 is rotated.

Figure 2:
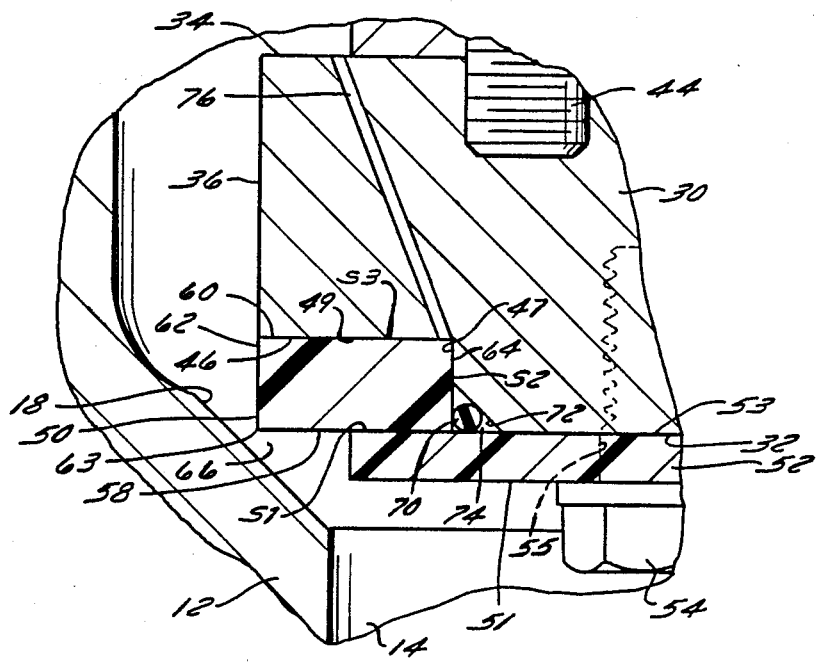
FIG. 2 is a greatly enlarged vertical cross-section view of a portion of the valve shown in FIG. 1.

Referring to FIGS. 1 and 2, valve disc 30 takes the form of a solid cylindrical metal member having a lower side 32, an upper side 34 and a cylindrical outer side 36. Upper side 34 has a recess 38 therein for receiving a protruberence 40 at the lower end of valve stem 20. An upper annular mounting ring 42 is secured to upper side 34 of valve disc 30 by bolts 44 and engages protruberence 40 so as to movably attach valve disc 30 to valve stem 20. Thus, valve disc 30 is rotatable and tiltable relative valve stem 20 to enable the valve disc 30 to adjustably position itself in a proper seating position relative to valve seat 18 when valve 10 is closed.

The lower side 32 of valve disc 30 has a ring-receiving groove 46 formed around the periphery thereof in which a seal ring 50 is disposed. Groove 46 is defined by a side wall 47 and a bottom wall 49 in valve disc 30. Side wall 47 is chamfered as at edge 72.

Figure 3:
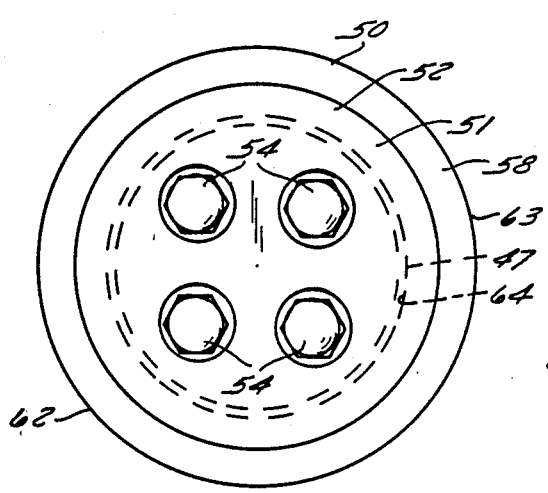
FIG. 3 is a bottom plan view of a portion of the valve taken on line 3—3 of FIG. 1.

As FIGS. 1, 2 and 3 show, seal ring 50 is held in place by a smaller-diameter circular metal retainer plate 52, which has a front surface 51 and a rear surface 53 and bolt holes 55 therethrough. Plate 52 is secured by a plurality of (four) bolts 54 against lower side 32 of valve disc 30 and against a front side 58 of seal ring 50.

Figure 4:
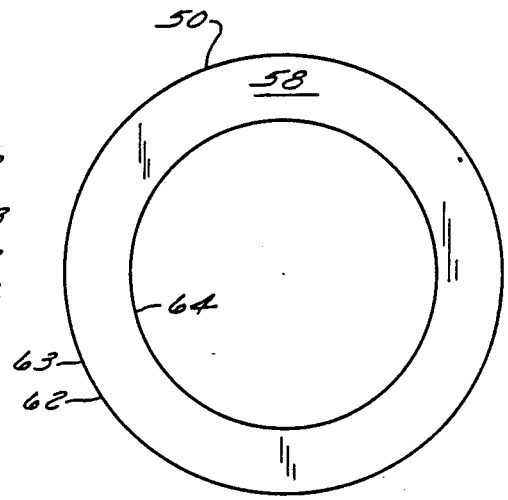
FIG. 4 is a bottom plan view of a seal ring shown in FIGS. 1, 2 and 3 and shows it removed from the valve.
Figure 5:
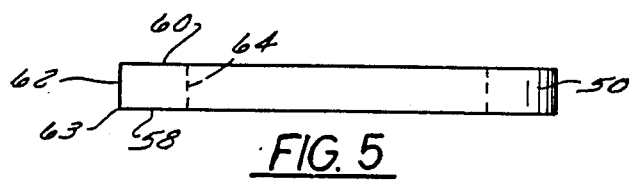
FIG. 5 is a side elevation view of the seal ring of FIG. 4.

When valve 10 is closed, a lower corner edge 63 of resilient seal ring 50 bears evenly against conically-shaped annular valve seat 18 in valve housing 12. Seal ring 50 is fabricated of plastic, such as TEFLON, which is slightly resiliently compressible and is also highly wear-resistant, so that it is able to deform slightly so as to evenly and tightly engage valve seat 18 to provide an even and tight seal when valve 10 is tightly closed. Upon opening valve 10, seal ring 50 is able to resume its normal shape. Seal ring 50 also has a very low coefficient of friction and resists wear damage resulting from repeated valve closures wherein its corner edge 63 is tightly pressed against metal valve seat 18. As FIGS. 2, 4 and 5, show seal ring 50 comprises the front side 58, a rear side 60, an outer edge 62, the lower corner edge 63 and an inner edge 64. The thickness of seal ring 50 (i.e. the distance between front side 58 and rear side 60) is slightly greater initially (i.e., before compression) than the depth of groove 46 in valve disc 30, proceeding inwardly from the lower side 32 of valve disc 30.

Referring to FIG. 2, because of the high fluid pressure condition which exist below valve disc 30 when valve 10 is closed and in operation, unless corrective action is taken in design and construction of the valve, there is a possibility of gas leakage along the following path: through a first space S1 between rear side 53 of the retainer plate 52 and front side 58 of seal ring 50, through a second space S2 between inner edge 64 of the seal ring 50 and side wall 47 of annular groove 46 in valve disc 30, and through a third space S3 between rear side 60 of seal ring 50 and bottom wall 49 of annular groove 46 in valve disc 30. Furthermore, when the valve 10 is cracked open slightly during operation, as shown in FIG. 2, the restricted, high velocity flow of fluid from the high pressure (port 14) to the low pressure (port 16) side of the valve through a space 66 between valve seat 18 and edge 63 of seal ring 30 creates a condition whereby, unless the aforesaid corrective action is taken, fluid can leak through the aforedescribed path. The result of such leakage, if not prevented, is to cause seal ring 50 to expand or be urged laterally or circumferentially outward relative to groove 46 due to high fluid pressure in the aforementioned second space S2 and relatively low fluid pressure in space 66. Over time, such phenomena has the effect of loosening seal ring 50 and enhancing the possibility of undesirable fluid leakage along the path defined by spaces S1, S2 and S3 when valve 10 is fully closed. The seal ring can be permanently deformed and prevent leak-tight closing of the valve.

Accordingly, as FIGS. 1 and 2 show, a large-diameter resilient compressible conventional O-ring 70 is disposed in annular groove or space 74 formed by chamfered edge 72 at the edge of the lower side 32 of valve disc 30 behind metal retainer plate 52 to effect a gas and liquid tight seal without requiring maximum compression of seal ring 50. As previously explained, the thickness of seal ring 50 is initially greater than the depth of its mounting groove 46 to allow for seal ring compression as the bolts 55 are tightened. A vent hole or passage 76 for pressure relief extends through valve disc 30 and communicates directly with spaces S2 and S3 between groove 46 and seal ring 50 therein and indirectly with space S1. Tests have shown that locating O-ring 70 at other possible locations, such as in space S3 between seal ring 50 and groove 46 in which the seal ring lies prevents fluid leakage but does not prevent fluid pressure build-up in space S2 which can cause undesirable circumferentially outward pressure on seal ring 50. Furthermore, location of O-ring 70 in space S1 could still allow undesirable fluid leakage through a bolt hole 55 and between plate 52 and lower side 32 of valve disc 30 into and through the spaces S2 and S3 and pressure build-up in space S3 when the valve is open to deform seal ring 50 outwardly.

We claim:

1. A stop valve (10) comprising:
   a valve housing (12) having a valve seat (18) therein;
   a valve disc (30) selectively movable relative to said valve seat (18) between closed and open positions;
   resiliently compressible seal means (50) for engagement with said valve seat (18) when said valve disc (30) is in closed position;
   means including a member (52) for entrapping and compressing said seal means (50) against said valve disc (30);
   said valve disc (30), said seal means (50) and said member (52) cooperating to define passage means (S1, S2, S3) through which fluid can leak when said valve disc (30) is in closed position;
   and a resiliently compressible O-ring (70) disposed and compressed in said passage means (S1, S2, S3) to prevent leakage of fluid.

2. A stop valve (10) according to claim 1 wherein said seal means (50) takes the form of an annular seal ring (50) having an annular inner edge (64) which cooperates with said valve disc (30) to define a portion (S2) of said passage means (S1, S2, S3); and wherein said O-ring (70) is disposed in said passage means to prevent fluid leakage into said portion (S2) of said passage means to thereby prevent said seal means (50) from being forced circumferentially outward by fluid pressure in said portion (S2) of said passage when said valve disc (30) is in said open position.

3. A stop valve (10) according to claim 1 or 2 wherein said valve disc (30) is provided with a vent hole (76) communicating with said passage means (S1, S2, S3) to vent air entrapped therein during assembly of said stop valve (10).

4. A stop valve (10) comprising:
   a valve housing (12) having a valve seat (18) therein;
   a valve disc (30) selectively movable relative to said valve seat (18) between closed and open positions;
   a resiliently compressible annular seal ring (50) for engagement with said valve seat (18) when said valve disc (30) is in closed position;
   means including a plate (52) engaged with said seal ring (50) for entrapping and compressing said seal ring (50) against said valve disc (30);
   and a resiliently compressible O-ring (70) disposed so as to prevent leakage of fluid through space between said plate (52) and said seal ring (50) and between said seal ring (50) and said valve disc (30), said O-ring (70) being compressed by said plate (52) in response to pressure exerted on said plate (52) to effect compressing of said seal ring (50).

5. A stop valve (10) according to claim 4 including a vent (76) in said valve disc (30) communicating with said space to allow for escape of entrapped air as said seal ring (50) and O-ring (70) are compressed during assembly of said stop valve (10).

6. A stop valve according to claim 4 or 5 wherein said valve disc (30) is provided with an annular groove (46) in which said annular seal ring (50) is disposed and entrapped by said plate (52);
   and wherein said O-ring (70) is disposed in an annular space (74) between and defined by said plate (52), said seal ring (50) and said valve disc (30).

7. A stop valve (10) according to claim 6 wherein said valve seat (18) has an annular conical surface which is engageable with a corner edge (63) of said seal ring (50).

8. A stop valve (10) according to claim 7 wherein said annular space (74) is bounded by a chamfered edge (72) of said valve disc (30).

9. A stop valve according to claim 6 wherein said annular space (74) is bounded by chamfered edge (72) of said valve disc (30).

10. A stop valve (10) comprising:
    a valve housing (12) having a valve seat (18) therein;
    a valve disc (30) selectively movable relative to said valve seat (18) between closed and open positions;
    a resiliently compressible annular seal ring (50) for engagement with said valve seat (18) when said valve disc (30) is in closed position;
    a plate (52) engaged with said seal ring (50) for entrapping said seal ring (50) against said valve disc (30);
    bolt means (54) engaged with said valve disc (30) and said plate (52) for securing said plate (52) to said valve disc (30) and for compressing said seal ring (50) against said valve disc (30);
    and a resiliently compressible O-ring (70) disposed so as to prevent leakage of fluid through space between said plate (52) and said seal ring (50) and between said seal ring (50) and said valve disc (30), said O-ring (70) being compressed by said plate (52) in response to pressure exerted on said plate (52) by said bolt means (54).

11. A stop valve according to claim 10 including a vent (76) in said valve disc (30) communicating with said space to allow for escape of entrapped air as said seal ring (50) and O-ring (70) are compressed during assembly of said stop valve (10).

12. A stop valve according to claim 10 or 11 wherein said valve disc (30) is provided with an annular groove (46) in which said annular seal ring (50) is disposed and entrapped by said plate (52);
    and wherein said O-ring (70) is disposed in an annular space (74) between and defined by said plate (52), said seal ring (50) and said valve disc (30).

13. A stop valve (10) according to claim 12 wherein said valve seat (18) has an annular conical surface which is engageable with a corner edge (63) of said seal ring (50).

14. A stop valve (10) according to claim 13 wherein said annular space (74) is bounded by a chamfered edge (72) of said valve disc (30).

15. A stop valve (10) according to claim 12 wherein said annular space (74) is bounded by a chamfered edge (72) of said valve disc (30).

* * * * *